3,275,400
DYEING POLYOLEFIN MATERIALS
Eckhard Bonitz and Manfred Daeuble, Frankenthal, Pfalz, Germany, assignors to Badische Anilin- & Soda-Fabrik Aktiengesellschaft, Ludwigshafen (Rhine), Germany
No Drawing. Filed Nov. 27, 1963, Ser. No. 326,362
Claims priority, application Germany, Nov. 30, 1962, B 69,815
7 Claims. (Cl. 8—4)

This invention relates to dyeing polyolefin materials with water-insoluble dyes which are however soluble in organic solvents, with the coemployment of organosilicon compounds.

It is known that polyolefins can be made dyeable with acid or basic dyes by incorporating monomers bearing basic or acidic groups (see for example British patent specification No. 879,195). When such monomers are incorporated, however, the mechanical and thermal properties of the polyolefins are impared.

According to German patent Specification No. 1,056,579, fibers, sheets and molded articles of polyolefins, for example polyethylene or polypropylene, with water-insoluble dyes which contain long chain alkyl radicals in the molecule. German patent specification No. 1,022,377 recommends that polyethylene materials should be dyed with aqueous suspensions of acetate silk dyes.

It is an object of this invention to dye polyolefins with dispersion dyes more permanent and faster shades than has been possible hitherto. Another object of the invention is to provide a simple and useful method for printing these materials. A further object of the invention is to accelerate dyeing and printing of polyolefins.

We have found that these and other objects are achieved by pretreating the material with a dispersion or solution of an organosilicon compound which is soluble in hydrocarbons or by coemploying the organosilicon compound in dispersed or dissolved form and if necessary subjecting the material thus deyed or printed to a thermal treatment.

We have further found that particularly fast dyeings and prints are obtained by coemploying in the dyeing or printing process a metal compound which is known to be a hardening catalyst for organosilicon compounds.

Organosilicon compounds which are suitable for the process according to this invention are silicon hydrocarbons such as alkylsilanes, arylsilanes and alkenylsilanes, alkylsiloxanes, arylsiloxanes, alkarylsiloxanes, alkylpolysiloxanes, arylpolysiloxanes and alkarylpolysiloxanes (generally known as silicone fluids or silicone resins), and also esters and polyesters of silicic acid, and also organosilanes which can be polycondensed to siloxanes by the action of water. Specific examples are tetraethylsilane, tetraphenylsilane, methyldibutoxysilane, triethylsilane, ethyltributoxysilane, vinyltriethoxysilane, allylmethyldimethoxysilane, phenyltrimethoxysilane, polymethylphenylsilane, hexaethyldisiloxane, tetrabutoxysilane, tertaethoxysilane, hexaethylsilane, tetraphenoxysilane, hexaphenoxydisiloxane, octaethoxycyclotetrasiloxane, polydiethoxysiloxane and dodecamethylcyclohexasilane.

The organic radical in the organosilicon compounds may in turn be substituted, preferably partly, with functional groups, for example amino, hydroxy, hydroxysulfato and polyethyleneglycol groups. Examples of such compounds are poly(γ-hydroxypropylmethyl)-siloxane and poly-(γ-hydroxysulfatopropylmethyl)-siloxane.

Organosilicon compounds which are substituted or partly substituted in the organic radical often have a better emulsifiability than the corresponding unsubstituted compounds; they are preferred in many cases for this reason. This is especially the case with poly-(γ-hydroxysulfatopropylmethyl)-siloxane or similar polymers in which about every tenth organic radical bears a functional group.

Since the success of the dyeing process depends, inter alia, on the wettability between the organosilicon compound and the polyolefin, it is in general advantageous to use a compound which has good wetting power. Wettability can easily be determined in a preliminary test. The organosilicon compounds are often obtained from the synthesis as a mixture of substances and not in a pure form; these mixtures may also be successfully used.

The effect of the organosilicon compounds according to this inventon as dyeing auxiliaries are substantially independent of their molecular weight. It has been observed, however, that low molecular weight compounds accelerate the dyeing process more than high molecular weight compounds. On the other hand, the former impart to the surface of the dyed material in many cases an oily nature which is often undesirable. Moreover the low molecular weight compounds tend to vaporize again so that the improvement in fastness achieved is lost again.

When high molecular weight organosilicon compounds are to be used, it has therefore proved to be advantageous not to start from the polymerized compounds but to allow these to form in situ from the monomeric compounds during the dyeing process in a conventional way using of water and suitable polymerization catalysts, such as acids or bases and particularly metal salts. Thus for example, from dimethyldimethoxysilane with the coemployment of sodium acetate and zirconium oxychloride and in the presence of water, there are obtained not only the monomers but also oligosiloxanes which, like the monomers, markedly accelerate the dyeing process and which in the course of this process and especially upon thermal fixation, are further condensed to high molecular weight polysiloxanes which ensure durable fastness.

Improvement in fastness may for example also be achieved by using organopolysiloxanes which bear silane hydrogen atoms, for example those having the grouping:

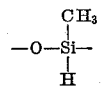

which further condense during thermal aftertreatment and crosslink, particularly in the presence of silicic acid esters. Crosslinking may also be effected via free silanol groups and/or hydroxyalkyl groups which can readily be eliminated hydrolytically. In general compounds having Si—H— linkages are given the preference because these yield very stable dispersions.

If polyfunctional compounds are used to block the terminal groups, crosslinking of the organosilicon macromolecular compound takes place—as already described—at the surface of colored material. In the case of dyeings, this gives particularly good fastness of the dyeing and sometimes also an improvement in the handle of fabrics. It is therefore generally advantageous to use macromolecular organosilicon compounds or mixtures of different functional compounds which under the conditions of fixing the dyeing, in the presence or absence of a catalyst, cure, i.e. crosslink.

Such crosslinking reactions are preferably carried out in the presence of compounds of transition metals which are known as condensation accelerators or curing catalysts. It is known that suitable curing catalysts include compounds of titanium, zirconium, chromium, nickel, lead, iron, cobalt, tin and zinc, for example their alkoxy compounds, carboxylic salts or alkyl-substituted carboxylic salts. Examples are: butyl titanate, zirconium acetate, chromium-2-octoate, lead-2-octoate, nickel-2-salts of coconut oil fatty acid mixtures, nickel-2-oleate, cobalt-2-stearate, dibutyl tin dilaurate, and zinc naphthenate:

combinations of nickel-2-salts and tin compounds containing fatty acid radicals in the molecule have proved to be very good.

All dyes which are compatible with the plastics material to be dyed are suitable, for example those which are capable of penetrating the polyolefin in a sintering test. These dyes are not soluble in water but are soluble in hydrocarbons, such as toluene, and may also be soluble in other organic solvents, such as esters, ketones and halohydrocarbons. When dyeing is to be carried out from aqueous dispersion, all the so-called dispersion dyes may be used and also dyes which are soluble in waxes and fats.

The following dyes, identified by their Color Index Numbers, are examples of dyes which have proved to be good, i.e. dyeings prepared with these dyes are more intense, faster to light and solvents and the dyes go on substantially more rapidly when using the organosilicon compounds than without these compounds: C. I. Nos. 62,015, 11,080, 64,500, 11,100, 11,410, 11,225, 60,755, 11,005, 26,090, 11,190, 62,050 and 12,700. Instead of dyes, oil-soluble optical brighteners, for example of the stilbene series, may also be used with good results.

When dyeing from aqueous dispersion, dispersing agents may be used which have a dispersing action both on the dye and on the organosilicon compound. Examples of such dispersing agents are ethoxylation products of fatty alcohols and their sulfuric acid monoesters, ethoxylation products of fatty amines, alkylated naphthalenesulfonic acids or ligninsulfonic acids and condensation products of naphthalenesulfonic acids with formaldehyde. Organsilicon compounds which bear in their organic radicals hydroxyl groups, or hydroxyl groups unilaterally esterified with sulfuric acid or polyalkylene oxide groups and which therefore themselves have an emulsifying action are particularly suitable dispersing agents. It has been found that the emulsified organosilicon compounds have a stabilizing action on the dye dispersions so that it is possible to use higher dye concentrations; this additional advantage is particularly favorable in pad-dyeing and printing sheets and textiles. The term "aqueous dispersion" does not exclude the presence of a certain amount of organic liquids in the dyebath. Nor does the term "organic solution" exclude the presence of a certain amount of water.

Polyolefin materials may also be dyed from organic solution by the process of this invention; this method is particularly suitable for writing or printing (lettering) and together with suitable thickening agents, such as silicone resins, copolymers of olefins with polysilanes and finely divided silicic acid, zinc oxide and/or titanium dioxide for printing (patterns). Filaments, threads, films, sheets, strips, tapes, textiles and other molded articles of polyolefins, particularly of polyethylene and isotactic polypropylene may be dyed or printed (with lettering or patterns).

Dyeing and printing (lettering or patterns) may in other respects be carried out by the conventional methods, preferably at temperatures between 20° C. and 100° C. This is true inter alia for the amount of dye to be used which for dye liquors is between about 0.01 and 1% with reference to the amount of liquor, and for inks and printing pastes between about 0.1 and 10%. The emulsifiers and metal catalysts are used in about the same amounts, whereas the organosilicon compounds, in the case of dye liquors, may be about five to twenty times and in the case of inks and printing pastes up to about one hundred times. The relative proportions are however not critical for the purposes of this invention but optimum proportions may easily be determined by the expert in each case. After dyeing or printing (lettering or patterns) has taken place, any loosely adherent dye on the surface of the material may be removed by dipping the material into a solvent, suitable surfactant detergents or solutions having strong reducing agents, for example alkali solutions and sodium dithionite, and/or if desired the dye may be allowed to dry, if desired at elevated temperature, preferably at 80° C. to 100° C., so that it diffuses into the material and, if the material is transparent, colors it transparently. In many cases it is advantageous first to pretreat the material to be dyed with the organosilicon compound and if desired with the hardening catalyst from organic solution, and then to carry out the treatment with the dye, if desired together with an organosilicon compound, either immediately or on a later occasion. Intermediate drying is often advantageous.

A valuable contribution is made by the process according to this invention to the technique of dyeing difficultly dyeable high molecular weight polyolefin materials because the dye intensity which can be achieved and the shortened dyeing periods make possible continuous dyeing or printing. In most cases the dye liquors are completely exhausted.

The invention is further illustrated by the following examples. The parts specified in the examples are parts by weight.

*Example 1*

Polypropylene cloth is treated for one and one half hours at 80° C. to 85° C. with a dye liquor composed of 4000 parts of water, 10 parts of polydimethylsiloxane having a viscosity of 100 cp. (centipoises), 2 parts of the sodium salt of the sulfuric acid monoester of the adduct of 80 moles of ethylene oxide to 1 mole of stearyl alcohol as emulsifier and 1 part of a finely divided blue anthraquinone dye (C. I. 62,050).

A polypropylene cloth dyed deep blue with good tinctorial fastness is obtained.

A similar dyeing is obtained by pretreating the cloth with a liquor composed of 4000 parts of water, 10 parts of the organosilicon compound and 1 part of the emulsifier and then with a dye liquor composed of 4000 parts of water, 1 part of emulsifier and 1 part of the dye.

*Example 2*

Polypropylene cloth is treated for two hours at 90° C. to 95° C. with a dye liquor composed of 4000 parts of water, 9 parts of polydimethylsiloxane having a viscosity of 500 cp. and 1 part of polydimethylsiloxane in whose molecule an average of one methyl group on every tenth silicon atom is replaced by a gamma-hydroxypropyl group monoesterified with sulfuric acid, and 2 parts of a finely divided orange azo dye (C. I. 11,080).

The cloth is dyed deep red orange.

The dyeing may be carried out in two liquors with the same result. The above liquor, without the dye, is used for the pre-treatment, and a liquor composed of 4000 parts of water, 1 part of the chemically modified polydimethylsiloxane and 2 parts of the dye is used for the dyeing.

*Example 3*

A polypropylene cloth is treated for one hour at 80° C. to 85° C. with a liquor prepared from 4000 parts of water, 8 parts of oily polydimethylsiloxane, 1.5 parts of polymonomethylhydrogensiloxane, 1 part of a methylsiloxane resin ($CH_3$:Si=1.2) and 2 parts of the ortho silicic acid ester of tridecanol, 0.8 part of zirconium oxychloride, 5 parts of sodium acetate, 2 parts of the emulsifier specified in Example 1 and 1 part of a yellow diazo dye (C. I. 16,090). The dyeing is then set for ten minutes at 110° C.

A bright yellow dyed cloth is obtained whose handle is soft, but not oily.

*Example 4*

Polypropylene cloth is treated for forty minutes at 80° to 85° C. with a liquor composed of 4000 parts of water, 5 parts of polydimethylsiloxane (viscosity 100 cp.), 0.7 part of polymethylhydrogensiloxane, 0.5 part of the chemically modified organosilicon compound specified in Example 2, 20 parts of nickel-2 oleate, 2 parts of potassium oleate and 2 parts of a blue azo dye (C. I. 11,410).

The dyeing is then fixed at 95° C. for sixty minutes. A deep blue, very fast dyeing is obtained.

The cloth may also be dyed with the same result by pretreating it with the above liquor but not containing the dye and then dyeing it with a liquor composed of 4000 parts of water, 0.5 part of the chemically modified organosilicon compound and 2 parts of the dye.

By using, instead of 20 parts of nickel-2 oleate, 18 parts of the same and 2 parts of dibutyl tin dilaurate and fixing the dyeing for 1½ hours at 55° C., a dyed cloth is obtained in which the softness of handle is fully retained.

Example 5

The dye liquor described in Example 1 is allowed to act for one minute at 90° C. on polyethylene sheeting. The dyeing is then fixed at 100° C. for two minutes.

A beautiful glossy sheeting having a uniform pale blue lustre is obtained.

Example 6

Molded articles of polyethylene having a wall thickness of 3 mm. are treated in the dye liquor described in Example 1 for one hour at 100° C.

The molded articles are dyed homogeneously deep blue throughout and have a beautiful surface lustre.

Example 7

0.5 part of an azonaphthalene unilaterally substituted by a hexyl radical, 5 parts of tetraethyl silicate and a solution of 2 parts of nickel-2 oleate, 1 part of triethanolamine and 10 parts of methylene chloride are added to a solution of 50 parts of a linear polymerized organosilicon compound prepared from 90% of ethyltriethoxysilane and 10% of phenyltriethoxysilane and 50 parts of methylene chloride.

This deep red solution is eminently suitable as a printing ink for printing molded articles of polyethylene. A clear red impression is obtained which is dried in the air. The same solution is also suitable as an impregnating varnish for polyolefin molded articles. If the solution be concentrated to one third of its original volume, it may be used for printing sheeting and cloth of polyolefins.

We claim:

1. A process for dyeing a polyolefin shaped article with a water-insoluble dye which is soluble in organic solvents, which process comprises: applying simultaneously to said article from a liquid medium (a) the dye and (b) a linear organosilicon polymer consisting essentially of the recurring units of the formula

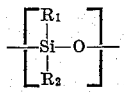

in which $R_1$ represents alkyl and $R_2$ represents a member selected from the group consisting of hydrogen, alkyl, hydroxyalkyl and hydroxyalkyl esterified with sulfuric acid.

2. A process as claimed in claim 1 wherein said dye and said linear organosilicon polymer are applied simultaneously to said article from an aqueous dispersion.

3. A process as claimed in claim 2 wherein said polymer is hardened by condensation to fix the dye to said article.

4. A process as claimed in claim 3 wherein said aqueous dispersion contains a metal compound capable of acting as a hardening catalyst for macromolecular organosilicon compounds.

5. A process as claimed in claim 1 wherein said dye and said linear organosilicon polymer are applied simultaneously to said article from an organic solution.

6. A process as claimed in claim 5 wherein said polymer is hardened by condensation to fix the dye to said article.

7. A process as claimed in claim 6 wherein said organic solution contains a metal compound capable of acting as a hardening catalyst for macromolecular organosilicon compounds.

References Cited by the Examiner

UNITED STATES PATENTS

| | | | |
|---|---|---|---|
| 2,436,304 | 2/1948 | Johannson | 8—8 |
| 3,099,515 | 7/1963 | Goodings et al. | 8—55 |

FOREIGN PATENTS

| | | |
|---|---|---|
| 659,414 | 3/1963 | Canada. |
| 1,022,377 | 1/1958 | Germany. |
| 1,056,579 | 5/1959 | Germany. |
| 563,995 | 9/1944 | Great Britain. |
| 879,195 | 10/1961 | Great Britain. |

OTHER REFERENCES

Speel et al., Textile Chemicals and Auxiliaries, 2nd ed., 1957, pp. 117, 121, 243 and 413.

NORMAN G. TORCHIN, *Primary Examiner.*

J. HERBERT, *Assistant Examiner.*